July 23, 1935.        G. SEARLE        2,009,026
PROTECTIVE DEVICE FOR AUTOMOBILES
Filed Sept. 19, 1934        3 Sheets-Sheet 3
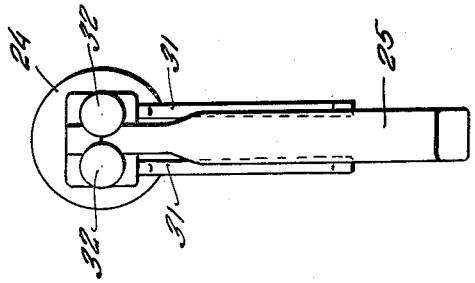
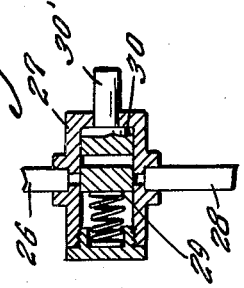
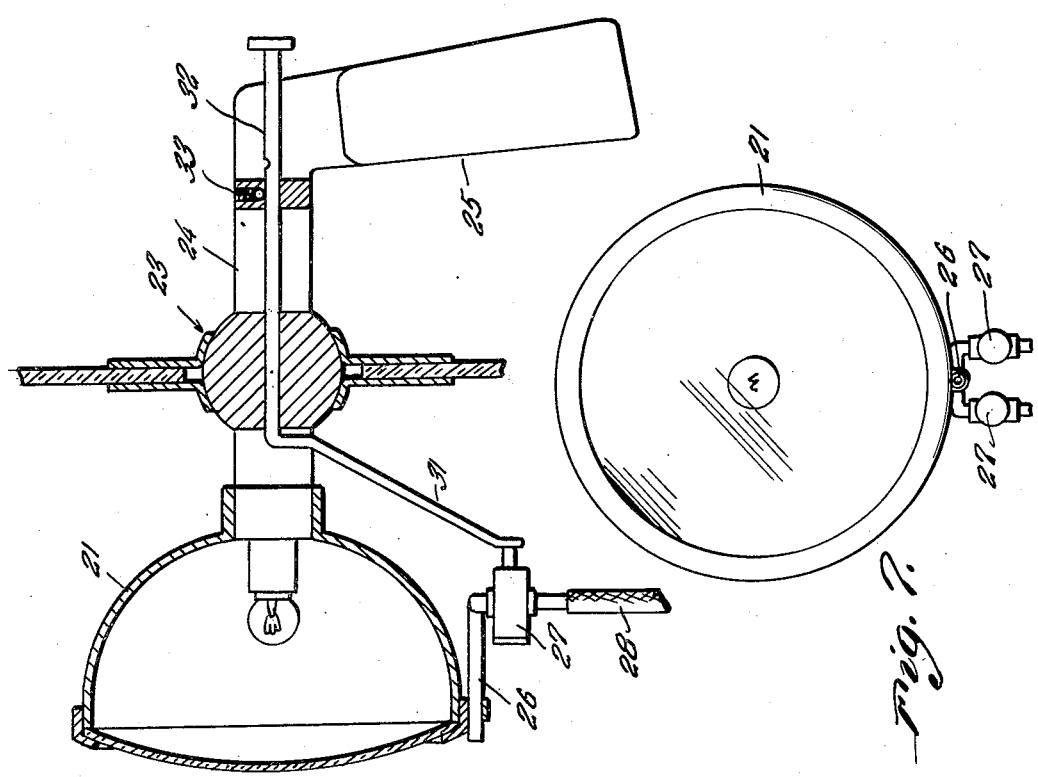
Inventor
George Searle
By *Clarence A. O'Brien*
Attorney Patented July 23, 1935

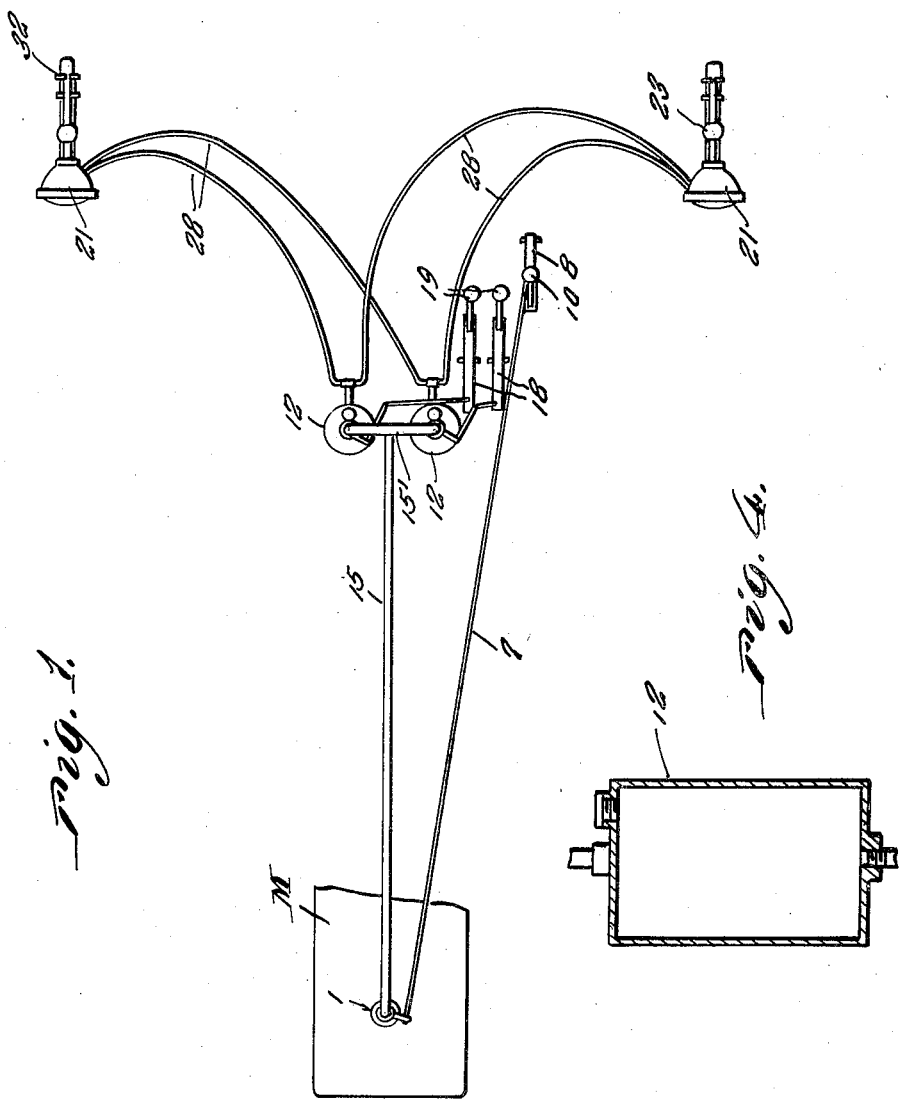

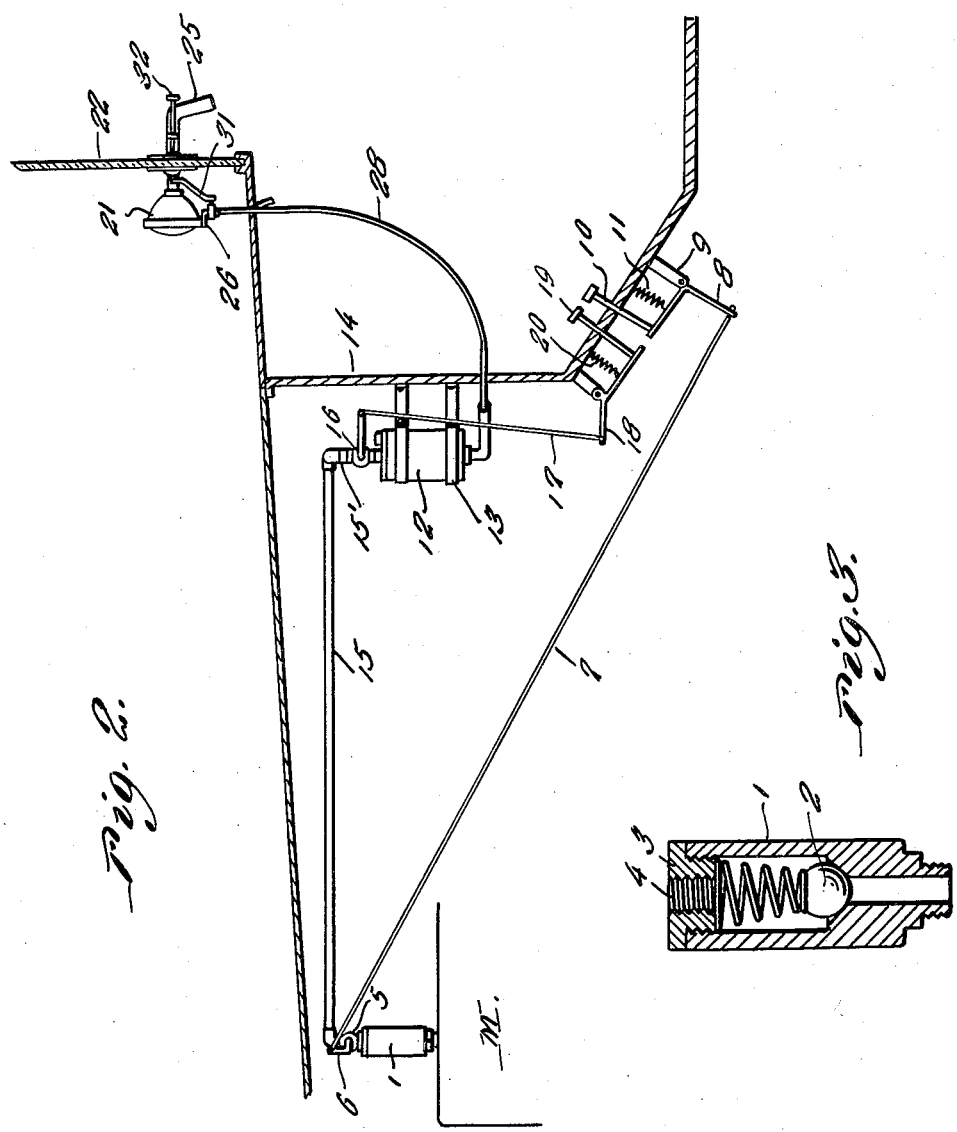

2,009,026

UNITED STATES PATENT OFFICE 2,009,026

PROTECTIVE DEVICE FOR AUTOMOBILES

George Searle, Shelby, Ind.

Application September 19, 1934, Serial No. 744,736

4 Claims. (Cl. 299—30)

This invention relates to a protective device for motor vehicles, the general object of the invention being to provide spot lights on suitable parts of the motor vehicle capable of being shifted by hand with manually operated means for applying coloring matter and acid or the like to nozzles carried by the spotlight whereby an occupant of the vehicle can direct rays of light upon holdup men and at the same time spray such men with the coloring matter and the acid.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 1 is a diagrammatic plan view of the invention.

Fig. 2 is a diagrammatic side elevation showing how the parts are arranged on parts of a motor vehicle.

Fig. 3 is a sectional view through the valve device which controls communication with one of the cylinders of the motor of the vehicle.

Fig. 4 is a sectional view through one of the tanks.

Fig. 5 is an elevation partly in section of one of the spotlights and showing the parts associated therewith.

Fig. 6 is a rear view of the spotlight.

Fig. 7 is a front view thereof.

Fig. 8 is a vertical sectional view through the valve which controls the flow of material to a nozzle.

In these drawings, the numeral 1 indicates a valve casing having a reduced lower end which is threaded so that this end can be placed in a threaded hole in the top of the motor M of the vehicle so that the interior of the casing will be in communication with a cylinder of the motor and said casing contains a downwardly closing spring-pressed valve 2 which acts as a non-return valve. A plug 3 is threaded in the top of the casing and has a threaded hole 4 therein for receiving a valve 5, the handle 6 of the plug of which is connected by a link 7 with a bell crank 8, pivoted to a bracket 9 depending from a part of the floor of the vehicle, a pedal 10 being slidably arranged in the floor for operating the bell crank to open the valve 6. A spring 11 is connected with the bell crank and normally holds the parts in a position with the valve 6 closed. A pair of tanks 12 are supported by the brackets 13 from the dash 14 of the vehicle and the upper ends of these tanks are connected by the pipes 15 with the valve 5 so that when the valve 5 is opened, pressure from the cylinder with which the casing 1 is in communication will flow into the tanks and place the contents thereof under pressure. A valve 16 is placed in each branch 15' which connects the pipes 15 with the tank and a link 17 connects the arm of each valve with a bell crank 18, each bell crank 18 being operated by a pedal 19 passing through the floor of the vehicle. A spring 20 acts to hold each bell crank 18 in a position with a valve 16 closed.

A pair of spot-lamps 21 is supported for rocking movement on the windshield 22 of the vehicle or on any other suitable portion, by the universal joints shown generally at 23. Each universal joint is associated with the stem 24 of a spotlight, the stem extending into the vehicle and being provided with a handle 25 so that the light can be turned by an occupant of the vehicle.

A nozzle 26 is carried by the lower part of each spot lamp 21 and the rear end of the nozzle is formed with two depending branches, each of which is in communication with a valve casing 27 and a hose 28 connects one branch below the casing with one of the tanks and a similar hose connecting the other branch below the other casing with the other tank. A spring pressed valve 29 is located in the casing 27, the spring of which normally holds the valve in position for placing the nozzle out of communication with a hose, and a button 30 is slidably arranged in each casing and has its stem 30' projecting through a hole in the casing, the stem being engaged by a bent end 31 of a rod 32 slidably supported by the stem of each spotlight, a detent 33 holding the rod in projected position.

By depressing the pedal 10 and either or both of the pedals 19 compression from the motor M will enter the tanks or the tank the pedal 19 of which has been depressed so that the material in the tanks will be placed under compression. Then if the motorist is held up, he can direct the rays of light from the spot lamps upon a hold-up man and then by pushing the rod 32 forwardly to open the desired valve, the material from either tank can be sprayed upon the hold-up man. I prefer to place coloring matter in one tank so that this material will spot the hold-up man and to place tear gas, acid or strong chemicals or some choking powder in the other tank so that this material will render the hold-up man helpless. As will be seen, either or both spotlights can be manipulated as desired and either spotlight can have its nozzle in communication with either tank.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. A protective device for a motor vehicle comprising a supporting member, a universal joint for connecting the member to a part of the vehicle, a handle connected to the member and located within the vehicle, a nozzle carried by the member, a tank carried by a part of the vehicle and containing spray material, a hose connecting the tank with the nozzle, a valve for controlling the flow of material from the hose into the nozzle, means carried by the handle for opening the valve, and means for placing the material in the tank under compression.

2. A protective device for a motor vehicle comprising a supporting member, a universal joint for connecting the member to a part of the vehicle, a handle connected to the member and located within the vehicle, a nozzle carried by the member, a tank carried by a part of the vehicle and containing spray material, a hose connecting the tank with the nozzle, a valve for controlling the flow of material from the hose into the nozzle, means carried by the handle for opening the valve, and means for placing the material in the tank under compression, said means including a valve casing in communication with a cylinder of the motor of the vehicle, a conduit connecting the casing with the tank and manually operated means for controlling the flow of compressed fluid into the tank.

3. A protective device for a motor vehicle comprising a pair of supporting members, each provided with a stem, universal joints connecting the stems with the windshield of the vehicle, a handle on the inner end of each stem, a nozzle carried by each member, each nozzle having a pair of rear branches, a valve in each branch, a pair of tanks carried by the vehicle, one containing coloring matter and the other matter injurious to the person whom it strikes, a tube connecting one valve with one tank, a tube connecting the other valve with the other tank, manually operated means carried by the stems for opening the valves, spring means for closing the valves, and means for introducing pressure into the tanks.

4. A protective device for a motor vehicle comprising a pair of supporting members, each provided with a stem, universal joints connecting the stems with the windshield of the vehicle, a handle on the inner end of each stem, a nozzle carried by each member, each nozzle having a pair of rear branches, a valve in each branch, a pair of tanks carried by the vehicle, one containing coloring matter and the other matter injurious to the person whom it strikes, a tube connecting one valve with one tank, a tube connecting the other valve with the other tank, manually operated means carried by the stems for opening the valves, spring means for closing the valves, and means for introducing pressure into the tanks, such means including a valve casing in communication with a cylinder of the motor of the vehicle, a downwardly closing spring-pressed valve in said casing, a valve connected to the top of the casing, a pipe having one end connected to the valve, branches connected with the other end of the pipe and leading into the tanks, a valve in each branch, manually operated means for controlling the valve at the top of the last mentioned casing, manually operated means for actuating the valves in the branches.

GEORGE SEARLE.